Patented May 27, 1947

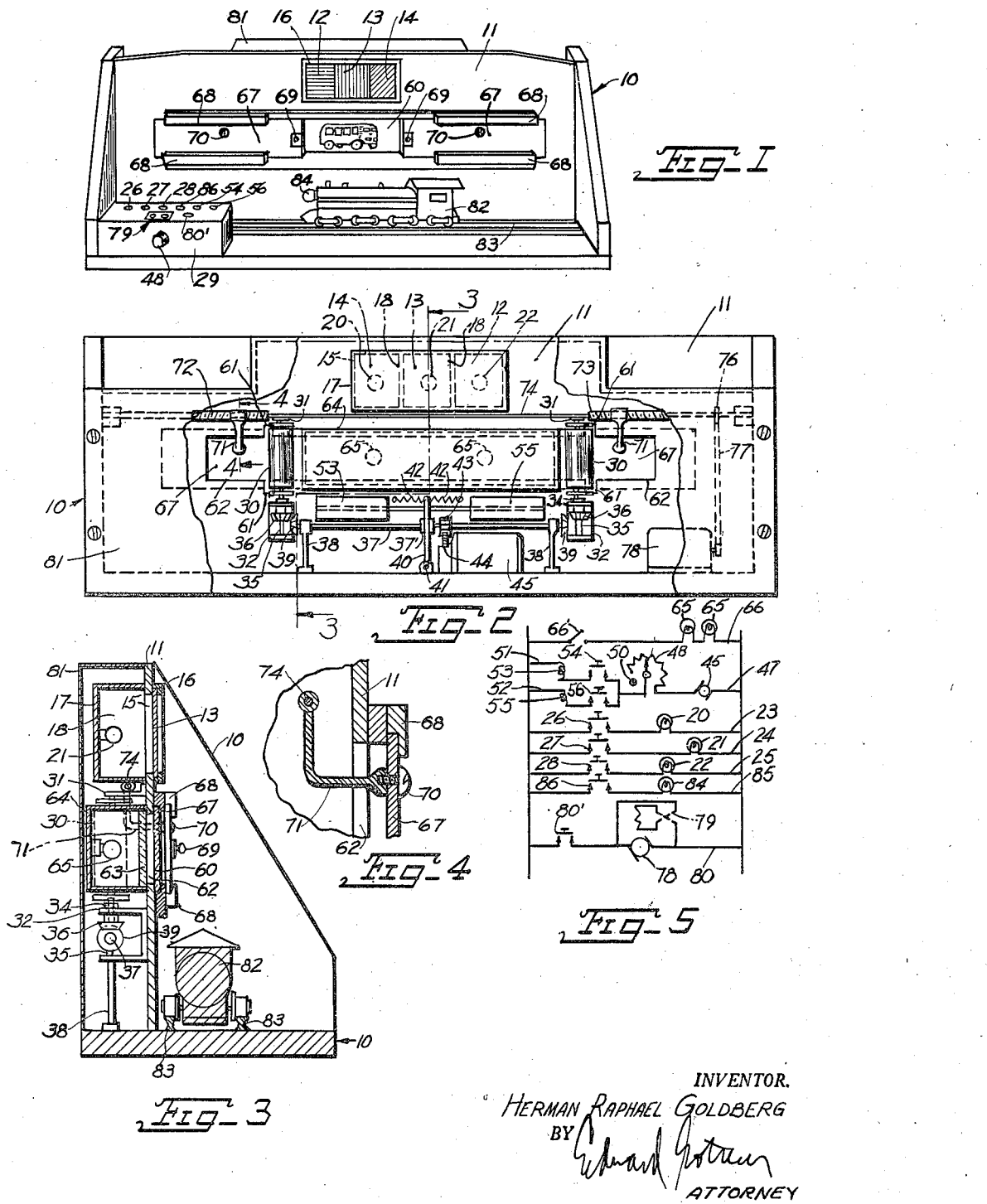

2,421,146

UNITED STATES PATENT OFFICE 2,421,146

DEVICE TO TEACH SPEECH TO DEAF AND HARD OF HEARING STUDENTS AND OTHERS

Herman Raphael Goldberg, Brooklyn, N. Y.

Application November 2, 1945, Serial No. 626,269

16 Claims. (Cl. 35—1)

This invention relates to new and useful improvements in devices to teach speech to deaf and hard of hearing students and to improve the speech of the foreign born, stutterers, and other speech defectives.

The invention may be better understood by first considering the present method of teaching the deaf that is widely used. One of the first tasks a deaf youngster faces is the problem of identifying and later, repeating, breath, voiced, and nasal sounds. They first learn to distinguish the differences between these types of sounds by placing their finger tips on the instructor's voice box for voiced sounds, in front of his lips as he speaks for breath sounds, and high on the cheek near the nose for nasal sounds. While learning the differences between these three types of sounds three pieces of colored paper are often used as visual signals to the deaf child to help him remember the breath, voiced and nasal sounds. They are taught that a blue paper represents a breath sound, e. g., "p, f, s, wh, t, k, sh," etc., a red paper represents a voiced sound, e. g. "b, v, d, r, l, w, z, g, j," etc., and all the vowels, and that a brown paper represents a nasal sound, e. g., m, n, ng. The instructor then proceeds to teach syllables, words, and expressions, stopping when the child makes an error and signalling with one of the three colored pieces of paper to help correct errors in articulation and to indicate the correct sound that should have been uttered. These words, pictures, syllables and expressions are usually printed on flash cards, and the instructor flashes them before a child and expects him to say them as each one appears. When an error is made, the instructor puts down the pack of flash cards, reaches for the colored paper that corresponds to the type of error made, and after getting a corrected response, proceeds.

Normal speech proceeds at the rate of 13 articulations per second. The speech of the deaf is often far below this normal rate because the bad habits of faulty breathing, slow, labored articulation, poor phrasing, etc., are not cleared up early in the child's training. The speech of the deaf, therefore, is often slow, hesitant, and garbled. The deaf frequently pause unnecessarily between words, and even are guilty of breathing between syllables of the same word.

This poor speech pattern is caused by the present method of using manually operated flash cards and manually operated correction signals which give the deaf student frequent opportunities to breathe between individual utterances and provide little opportunity for increasing the rate of speech, a prime requisite for improved phrasing and rhythm. Because the deaf never hear words as others do they cannot imitate normal rate, phrasing and articulation unless they are taught how. Even though there is nothing wrong with their speech organs they may always be recognized by their hesitant, gutteral speech.

The new device, in accordance with this invention, uses some of the principles traditionally used in teaching the deaf, as explained above.

However, the correction color signals are electrically controlled instead of the present day manual operation. Because of the electrical control it is possible to operate the signals much more rapidly, and with only the instructor's fingertip involved in the flashing of the color. This leaves the right hand of the instructor free to take the child's hand and place it on his voice box, in front of his lips, or high on the cheek as an additional kinesthetic means of correction.

In addition, instead of flash cards, the material presented to the child is imprinted on moving tapes, the speed of movement being controlled so that the teacher can vary the rate of the moving words, symbols, pictures, expressions or other material according to the needs of the individual pupil. As the student develops in good speech production, the increase in the rate of movement of the tapes is a definite sign of progress to him and spurs him on to even greater effort. A wide variety of tapes provides material for all the breath, voiced, and nasal sounds described above, and, in addition, the battery includes vowel drills, language stories for the deaf, and other valuable teaching aids.

Thus the whole process of giving speech to the deaf can be speeded up and bring better results.

The "ch" sound as in "church" is a breath sound, but it is one of the most difficult to teach the students. They invariably mispronounce it as the soft "sh" sound, also a breath sound. Because of this very common error it is necessary to provide a special signal by which the instructor may rapidly signal to the students an error in this respect. In the device a locomotive has been selected as representing the "ch" sound, and its light is flashed on when the child says "shair" for "chair."

More specifically, it is proposed to construct a device as mentioned designed to effect more accurate speech production and more normal rate of speech, with the comcomitant improvement of rhythm and phrasing in the speech of acoustically handicapped people. The device provides a means for the elimination of faulty production of consonant sound substitutions. The new device provides a means for learning how to make rapid changes from breath to voice to nasal consonants, which eventually should produce more normal rhythm and phrasing in the speech of students.

The new device is characterized by three visual signals for respectively representing breath, voice and nasal consonants. Another visual signal is provided for representing the "ch" sound in the English language. In conjunction with these signals means is provided for displaying a series of pictures of familiar objects, and, or words, which contain the speech element or sound desired to be taught in a particular lesson.

The preferred visual signals used in the present invention are in the nature of signal lights of different colors. A locomotive is associated with the signal representing the "ch" sound to make it easy for the student to recall it.

Another object of the invention is the construction of a device as described, which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Fig. 1 is a perspective view of a device to teach speech to deaf and hard of hearing students, constructed in accordance with this invention.

Fig. 2 is a rear elevational view of the device shown in Fig. 1 with certain parts broken away to disclose interior parts.

Fig. 3 is a fragmentary enlarged vertical sectional view taken on the line 3—3 of Fig. 2.

Fig. 4 is a fragmentary enlarged vertical sectional view taken on the line 4—4 of Fig. 2.

Fig. 5 is a schematic wiring diagram of the device.

The device, in accordance with this invention, includes a stand 10 having a back board 11. A group of three different colored panels 12, 13 and 14 are mounted on the back board 11 and represent breath, voiced and nasal consonants, respectively. The breath consonant panel 12 is blue, the voiced consonant panel 13 is red, and the nasal consonant panel 14 is brown. These panels may be constructed of thermo-plastic material. The back board 11 is formed with an opening 15. The panels 12, 13 and 14 are mounted over this opening 15 and are held in place by a frame 16. These panels are associated with means by which they may be selectively illuminated. This means includes a lamp housing 17 mounted upon the back of the back board 11 and divided into separate chambers by partitions 18 so that there is one chamber behind each of the panels 12, 13 and 14. These chambers are provided with lamps 20, 21 and 22, respectively. These lamps are connected in electric circuits 23, 24 and 25, respectively, controlled by push button switches 26, 27 and 28 respectively. These switches are mounted upon a control box 29 mounted on the stand 10.

A pair of spools 30 are turnably mounted on the back of the back board 11. Each of these spools 30 is supported between a top bracket 31 and a bottom bracket 32. The top brackets 31 are flexible so that they may be bent up to release the spools 30 which may then be replaced. The bottom ends of the spools 30 are indirectly supported on the brackets 32. They are formed with slits which engage tongued wheels 34 rotatively mounted on the brackets 32. These wheels 34 are mounted on axles 35 which are provided with bevel gears 36. A shaft 37 is rotatively supported on standards 38 mounted on the stand 10. The shaft 37 is provided with bevel gears 39 at its ends which are respectively engageable with the bevel gears 36 when the shaft 37 is shifted laterally in one direction or the other. The shaft 37 is normally held in a neutral position. It is provided with a grooved collar 37' which is engaged by a lever 40. The lever 40 is pivotally mounted by a pintle pin 41 at its bottom end.

The top end of the lever 40 is held in a neutral position by a pair of springs 42 connected with the lever 40 and extended in opposite directions and having their remote ends mounted upon the back board 11. The shaft 37 is provided with a spur gear 43 which is engaged by a gear transmission 44 connected with an electric motor 45. The electric motor 45 is connected in a circuit 47 which includes a rheostat 48 by which the speed of the motor 45 may be varied. The rheostat 48 is mounted on the control box 29. The rheostat 48 has an isolated contact 50 upon which its control arm may engage and which represents the open condition of the rheostat and thus an open condition of the circuit 47.

The circuit 47 includes a parallel section consisting of the parallel leads 51 and 52. The lead 51 includes in series a solenoid 53 and a push button or other type of switch 54. The lead 52 includes in series a solenoid 55 and a push button or other type of switch 56. The switches 54 and 56 are mounted on the control box 29. The solenoids 53 and 55 are mounted on the back of the back board 11 to the opposite sides of the lever 40, and their movable cores are connected with said lever 40. When the switch 54 is closed the circuit through the solenoid 53 and motor 45 is closed, energizing the motor and solenoid and causing the lever 40 to pivot in one direction to correspondingly move the shaft 37 and engage one of the bevel gears 39 with one of the bevel gears 36 for driving one of the spools 30. When the switch 56 is closed the solenoid 55 will be energized to pivot the lever 40 in the other direction to cause the other bevel gear 39 to engage the other bevel gear 36 for driving the other spool 30. The purpose of this construction is to drive a tape 60 associated with the spools in either direction.

The tape 60 is wound upon the spools 30 and passes through slots 61 formed in the back board 11 for displaying a section of the tape 60 on the front of the back board 11 and for displaying a series of pictures of familiar objects, or words, which we can generically call symbols, and which contain the speech element or sound desired to be taught in a particular lesson. The front section of the tape 60 passes over an opening 62 formed in the back board 11. A ground glass 63 is mounted over the opening 62. A lamp housing 64 is mounted upon the back of the back board 11 over the ground glass 63 and the opening 62. This housing 64 contains lamps 65 for illuminating the displayed front portion of the tape 60. The lamps 65 are contained in a circuit 66 controlled with a switch 66'.

A pair of slides 67 are slidably mounted upon the front of the back board 11 over the ends of the front section of the tape 60 for covering areas of the front section of said tape, as desired. These slides 67 are mounted on tracks 68. The slides 67 have knobs 69 by which they may be manually moved. The slides 67 may also be automatically moved. The slides 67 are releasably connected by small screws 70 with arms 71 which threadedly engage right and left hand thread sections 72 and 73 formed on a rod 74.

which is rotatively supported behind the back board 11. The arms 71 pass through the opening 62. The rod 74 is provided with a gear 76 engaged by a chain 77 connected with the drive pinion of an electric motor 78. The motor 78 is associated with a reversing switch 79 and is connected in a circuit 80 controlled by a push button switch 80'. A back cover 81 is removably mounted upon the back of the stand 10.

The front of the stand 10 is equipped with a simulation of a locomotive 82. The locomotive 82 is supported on toy tracks 83 mounted on the stand 10. At the front the locomotive has a lamp 84 which is connected in a circuit 85 controlled by a push button switch 86. The lamp 84 is for the purpose of calling attention to the locomotive for representing the "ch" sound in the English language.

The operation of the device may be understood from the following:

If a student is totally deaf and has no knowledge whatsoever of speech, the instant device cannot be used alone. It is necessary that the student learn to distinguish the difference between breath, voiced and nasal sounds by placing his fingertips on the instructor's voice box for voiced sounds, in front of his lips for breath sounds, and high on the cheek near the nose for nasal sounds. While learning the differences between these three types of sounds the student is taught that the blue panel 12 represents breath sounds like "p, f, s, wh, t, k, sh," etc., the red panel 13 represents voiced sounds, e. g., "b, v, d, r, l, w, z, g, j," etc., and all the vowels, and the brown panel 14 represents nasal sounds, e. g., "m, n, ng."

The instructor then proceeds to teach words, expressions and other speech material, stopping when the student makes an error and signalling with one of the panels 12, 13 or 14 to help correct errors in articulation, and to indicate the correct sound that should have been uttered. The syllable "ch" is also taught and the student is taught to know that the locomotive 82 and its lamp 84 represents said sound. Now the instructor is ready to proceed to use the illustrated tape 60 to teach the speaking of words. Should the student make errors the instructor indicates that fact by suitably operating the signal panels 12, 13 or 14, or the lamp 84 of the locomotive 82.

The students and the instructor watch the device while the instructor manipulates the controls on the control box 29. The tape 60 is driven right or left by closing one or the other of the switches 54 or 56. The speed with which the tape 60 moves may be controlled by setting the rheostat 48, which controls the speed of the motor 45. When the switch 54 is closed the solenoid 53 is energized causing the lever 49 to pivot towards the left (in relation to Fig. 2). This indirectly moves the shaft 37 slightly to the left and engages the left bevel gear 39 with the left bevel gear 36. Since the circuit 47 is now closed through the motor 45, the shaft 37 is rotating, and indirectly drives the left spool 30. When the switch 56 is closed the solenoid 55 is energized and the motor 45 will indirectly drive the spool 30 at the right.

The tape 60 is illuminated by closing the switch 66' so that the lamps 65 operate. As the tape 60 moves across the front of the back board 11 a student names the various symbols on the tape and the instructor presses whenever necessary one of the four push button switches 26, 27, 28 or 86, depending upon whether the pupil needs prompting and the sound to be taught is breath, voice, or nasal, or the "ch" sound. The slides 67 may be caused to move together or apart so as to properly frame a symbol (or word) which appears on the tape 60. The slides 67 are moved by operation of the reversing switch 79 and switch 80' which control the motor 78. When the switch 79 is closed in one direction the motor 78 will rotate in one direction, and indirectly drive the rod 74 so that the right and left hand screw threaded portions 72 and 73 move the arms 71 towards each other and thus the slides 67 move together. When the reversing switch 79 is closed in the other direction the motor 78 rotates in the other direction and indirectly moves the slides 67 apart. The means for operating the slides 67 may be disconnected by removing the screws 70 which disconnect the slides 67 from the arms 71. The slides 67 may be manually moved by the knobs 69. When the manual operation is desired it is not necessary to have the automatic means.

The tape 60 is imprinted with a series of symbols, such as pictures or words of speech to be taught, and the speed of the tape controls the rhythm of speech of the pupil. The instructor can control the speed of the tape and in this way teach proper rhythm of speech.

The device to teach speech to deaf and hard of hearing students, in accordance with this invention, may also be used to improve the speech of foreign born, stutterers and other speech defectives.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A device to teach increased rate, correct articulation, and normal rhythm speech to deaf and hard of hearing students and others, comprising a stand, three rapidly operable visual different signals mounted on said stand for representing breath, voiced, and nasal consonants respectively, another rapidly operable visual signal visually different from signals and mounted on said stand for representing the "ch" sound in the English language, and means including a movable tape for displaying at a desirable speed a series of symbols of familiar objects that contain the speech element or sound desired to be taught in a particular lesson.

2. A device to teach increased rate, correct articulation, and normal rhythm speech to deaf and hard of hearing students and others, comprising a stand, three rapidly operable visual different signals mounted on said stand for representing breath, voiced, and nasal consonants respectively, another rapidly operable visual signal visually different from said signals and mounted on said stand for representing the "ch" sound in the English language, and means including a movable tape for displaying at a desirable speed a series of symbols of familiar objects that contain the speech element or sound desired to be taught in a particular lesson, said three visual signals being in the nature of different colored panels, and means for selectively illuminating these panels.

3. A device to teach increased rate, correct articulation, and normal rhythm speech to deaf and hard of hearing students and others, comprising a stand, three rapidly operable visual different signals mounted on said stand for representing breath, voiced, and nasal consonants respectively, another rapidly operable visual signal visually different from said signals and mounted on said stand for representing the "ch" sound in the English language and means including a movable tape for displaying at a desirable speed a series of symbols of familiar objects that contain the speech element or sound desired to be taught in a particular lesson, said three visual signals being in the nature of different colored panels, and means for selectively illuminating these panels, said panels being colored blue, red and brown to represent breath, voiced and nasal consonants, respectively.

4. A device to teach increased rate, correct articulation, and normal rhythm speech to deaf and hard of hearing students and others, comprising a stand, three rapidly operable visual different signals mounted on said stand for representing breath, voiced, and nasal consonants respectively, another rapidly operable visual signal visually different from said signals and mounted on said stand for representing the "ch" sound in the English language, and means including a movable tape for displaying at a desirable speed a series of symbols of familiar objects that contain the speech element or sound desired to be taught in a particular lesson; said latter visual signal comprising a simulation of a locomotive and a controllable light thereon.

5. A device to teach increased rate, correct articulation, and normal rhythm speech to deaf and hard of hearing students and others, comprising a stand, three rapidly operable visual different signals mounted on said stand for representing breath, voiced, and nasal consonants respectively, and means for including a movable tape displaying at a desirable speed a series of symbols of familiar objects that contain the speech element or sound desired to be taught in a particular lesson, drive means for driving said tape, and manual means for controlling said drive means.

6. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said backboard for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, and means for rapidly selectively illuminating said colored panels.

7. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, and means for rapidly selectively illuminating said colored panels, said means for moving said tape including an electric motor and control means for driving the tape in one direction or the other.

8. A device to teach increased rate, correct articulation, and normal rhythm speech to deaf and hard of hearing students and others, comprising a stand having a back board, a group of three different colored panels mounted on said back board for representing breath, voiced, and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, and means for rapidly selectively illuminating said colored panels, comprising lights for illuminating said panels, and means for controlling said lights.

9. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, a simulation of a locomotive, and means for signalling attention to the locomotive for representing the "ch" sound in the English language.

10. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, a simulation of a locomotive, and means for signalling attention to the locomotive for representing the "ch" sound in the English language, comprising an electric lamp on said locomotive.

11. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape.

12. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape, said slides being mounted on tracks to be manually movable.

13. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape, and means for automatically moving said slides.

14. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape, a rotative rod having right and left hand thread sections, arms threadedly engaging said thread sections and connected with said slides, and means for rotating said rod in one direction or the other.

15. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape, a rotative rod having right and left hand thread sections, arms threadedly engaging said thread sections and connected with said slides, and means for rotating said rod in one direction or the other, including an electric motor.

16. A device to teach increased rate, correct articulation, and normal rhythm speech to deaf and hard of hearing students and others, comprising a stand having a back board, a group of three different colored panels mounted on said back board for representing breath, voiced and nasal consonants, a pair of spaced spools turnably mounted behind said back board for a tape, a tape wound on said spools and passing through openings in said back board for displaying a section of said tape on the front of said back board and displaying a series of symbols of familiar objects that contain the speech element or sound desired to be taught in a particular lesson, means for moving said tape at selected speeds, means for rapidly selectively illuminating said colored panels, and slides for covering areas of the exposed sections of said tape, a rotative rod having right and left hand thread sections, arms threadedly engaging said thread sections and connected with said slides, and means for rotating said rod in one direction or the other, including an electric motor, and means for reversing the drive of said motor.

HERMAN RAPHAEL GOLDBERG.

REFERENCES CITED

The following references are of record in the file of this patent:

UNITED STATES PATENTS

| Number | Name | Date |
| --- | --- | --- |
| 2,212,431 | Bly | Aug. 20, 1940 |
| 2,152,955 | Coyne | Apr. 4, 1939 |
| 1,835,778 | Huenlich | Dec. 8, 1931 |
| 1,733,605 | Jones | Oct. 29, 1929 |
| 1,586,960 | Bowen | June 1, 1926 |
| 726,484 | Warren | Apr. 28, 1903 |
| 1,392,014 | Jones | Sept. 27, 1921 |
| 539,731 | Fessler | May 21, 1895 |
| 2,305,993 | Ramsey | Dec. 22, 1942 |
| 1,535,056 | Stoloff | Apr. 21, 1925 |

FOREIGN PATENTS

| Number | Country | Date |
| --- | --- | --- |
| 449,426 | Great Britain | 1936 |

OTHER REFERENCES

The Story of My Life, Helen Keller; School edition, by Eleonore Pollack-Ottendoref, Houghton Mifflin Co., 1928, pages 57 and 60. (Division 53, Patent Office, 35-1.)